United States Patent
Good et al.

(10) Patent No.: US 7,542,880 B2
(45) Date of Patent: Jun. 2, 2009

(54) TIME WEIGHTED MOVING AVERAGE FILTER

(75) Inventors: Richard P. Good, Austin, TX (US);
Kevin A. Chamness, Austin, TX (US);
Uwe Schulze, Dresden (DE)

(73) Assignee: Advanced Micro Devices, Inc., Austin, TX (US)

( * ) Notice: Subject to any disclaimer, the term of this patent is extended or adjusted under 35 U.S.C. 154(b) by 482 days.

(21) Appl. No.: 11/278,840

(22) Filed: Apr. 6, 2006

(65) Prior Publication Data

US 2007/0239285 A1  Oct. 11, 2007

(51) Int. Cl.
G06F 19/00 (2006.01)
H03F 1/26 (2006.01)
H04B 15/00 (2006.01)
G01N 37/00 (2006.01)
G06F 15/00 (2006.01)
G06F 17/18 (2006.01)
G06F 11/30 (2006.01)
G21C 17/00 (2006.01)
G05B 13/02 (2006.01)
G06F 7/60 (2006.01)
G06F 17/10 (2006.01)

(52) U.S. Cl. .............. 702/194; 702/84; 702/179; 702/183; 702/199; 700/29; 700/52; 700/109; 700/121; 703/2

(58) Field of Classification Search ........... 700/28, 700/29, 44, 52, 108–110, 117, 121, 179; 702/81, 84, 127, 179, 181, 182, 183, 185, 702/190, 191, 194, 195, 199; 703/2; 714/746
See application file for complete search history.

(56) References Cited

U.S. PATENT DOCUMENTS 3,805,032 A * 4/1974 Ross .................. 702/181

5,060,132 A * 10/1991 Beller et al. ........... 700/38
5,091,872 A * 2/1992 Agrawal ................ 703/14
5,915,274 A * 6/1999 Douglas ................ 73/462

(Continued)

FOREIGN PATENT DOCUMENTS

WO  01/80306  10/2001

OTHER PUBLICATIONS

PCT Search Report Dated Aug. 2, 2007 for serial No. PCT/US07/004373.
"EWMA/SD: An End-of-Line SPC Scheme to Monitor Sequence-Disordered Data," by Fan, et al, 1997.

*Primary Examiner*—Crystal J Barnes-Bullock
(74) *Attorney, Agent, or Firm*—Williams, Morgan & Amerson, P.C.

(57) ABSTRACT

A method for estimating a state associated with a process includes receiving a state observation associated with the process. The state observation has an associated process time. A weighting factor to discount the state observation is generated based on the process time. A state estimate is generated based on the discounted state observation. A system includes a process tool, a metrology tool, and a process controller. The process tool is operable to perform a process in accordance with an operating recipe. The metrology tool is operable to generate a state observation associated with the process. The process controller is operable to receive the state observation, the state observation having an associated process time, generate a weighting factor to discount the state observation based on the process time, generate a state estimate based on the discounted state observation, and determine at least one parameter of the operating recipe based on the state estimate.

21 Claims, 4 Drawing Sheets

U.S. PATENT DOCUMENTS

| | | | | |
|---|---|---|---|---|
| 6,161,054 | A * | 12/2000 | Rosenthal et al. | 700/121 |
| 6,317,686 | B1 * | 11/2001 | Ran | 701/210 |
| 6,460,002 | B1 | 10/2002 | Bone et al. | 702/81 |
| 6,473,084 | B1 * | 10/2002 | Phillips et al. | 345/440 |
| 6,502,063 | B1 * | 12/2002 | Eriksson et al. | 702/190 |
| 6,553,114 | B1 * | 4/2003 | Fisher et al. | 379/265.12 |
| 6,718,587 | B2 * | 4/2004 | Hayes et al. | 8/159 |
| 7,039,519 | B2 * | 5/2006 | Ishiguro et al. | 701/124 |
| 7,065,131 | B2 * | 6/2006 | Bergel | 375/152 |
| 7,085,677 | B1 * | 8/2006 | Champlin et al. | 702/182 |
| 7,130,368 | B1 * | 10/2006 | Aweya et al. | 375/376 |
| 7,315,514 | B2 * | 1/2008 | Heiner et al. | 370/230 |
| 7,356,377 | B2 * | 4/2008 | Schwarm | 700/108 |
| 2004/0249723 | A1 * | 12/2004 | Mayer | 705/26 |
| 2004/0267399 | A1 | 12/2004 | Funk | 700/121 |
| 2007/0142949 | A1 * | 6/2007 | Wang et al. | 700/108 |

* cited by examiner

TIME WEIGHTED MOVING AVERAGE FILTER

CROSS-REFERENCE TO RELATED APPLICATIONS

Not applicable.

STATEMENT REGARDING FEDERALLY SPONSORED RESEARCH OR DEVELOPMENT

Not applicable

BACKGROUND OF THE INVENTION

The present invention relates generally to manufacturing and, more particularly, to the use of a time weighted moving average filter.

There is a constant drive within the semiconductor industry to increase the quality, reliability and throughput of integrated circuit devices, e.g., microprocessors, memory devices, and the like. This drive is fueled by consumer demands for higher quality computers and electronic devices that operate more reliably. These demands have resulted in a continual improvement in the manufacture of semiconductor devices, e.g., transistors, as well as in the manufacture of integrated circuit devices incorporating such transistors. Additionally, reducing the defects in the manufacture of the components of a typical transistor also lowers the overall cost per transistor as well as the cost of integrated circuit devices incorporating such transistors.

Generally, a set of processing steps is performed on a group of wafers, sometimes referred to as a "lot," using a variety of processing tools, including photolithography steppers, etch tools, deposition tools, polishing tools, rapid thermal processing tools, implantation tools, etc. The technologies underlying semiconductor processing tools have attracted increased attention over the last several years, resulting in substantial refinements. However, despite the advances made in this area, many of the processing tools that are currently commercially available suffer certain deficiencies. In particular, such tools often lack advanced process data monitoring capabilities, such as the ability to provide historical parametric data in a user-friendly format, as well as event logging, real-time graphical display of both current processing parameters and the processing parameters of the entire run, and remote, i.e., local site and worldwide, monitoring. These deficiencies can engender non-optimal control of critical processing parameters, such as throughput, accuracy, stability and repeatability, processing temperatures, mechanical tool parameters, and the like. This variability manifests itself as within-run disparities, run-to-run disparities and tool-to-tool disparities that can propagate into deviations in product quality and performance, whereas an ideal monitoring and diagnostics system for such tools would provide a means of monitoring this variability, as well as providing means for optimizing control of critical parameters.

One technique for improving the operation of a semiconductor processing line includes using a factory wide control system to automatically control the operation of the various processing tools. The manufacturing tools communicate with a manufacturing framework or a network of processing modules. Each manufacturing tool is generally connected to an equipment interface. The equipment interface is connected to a machine interface that facilitates communications between the manufacturing tool and the manufacturing framework. The machine interface can generally be part of an advanced process control (APC) system. The APC system initiates a control script based upon a manufacturing model, which can be a software program that automatically retrieves the data needed to execute a manufacturing process. Often, semiconductor devices are staged through multiple manufacturing tools for multiple processes, generating data relating to the quality of the processed semiconductor devices.

During the fabrication process, various events may take place that affect the performance of the devices being fabricated. That is, variations in the fabrication process steps result in device performance variations. Factors, such as feature critical dimensions, doping levels, contact resistance, particle contamination, etc., all may potentially affect the end performance of the device. Various tools in the processing line are controlled in accordance with performance models to reduce processing variation. Commonly controlled tools include photolithography steppers, polishing tools, etching tools, and deposition tools. Pre-processing and/or post-processing metrology data is supplied to process controllers for the tools. Operating recipe parameters, such as processing time, are calculated by the process controllers based on the performance model and the metrology information to attempt to achieve post-processing results as close to a target value as possible. Reducing variation in this manner leads to increased throughput, reduced cost, higher device performance, etc., all of which equate to increased profitability. Metrology data collected before, during (i.e., in-situ), or after the processing of a wafer or lot of wafers may be used to generate feedback and/or feedforward information for use in determining a control action for the previous process tool (i.e., feedback), the subsequent process tool (i.e., feedforward), or both.

Typically, a controller adjusts an operating recipe for a controlled tool using feedback or feedforward metrology information. Control actions are typically generated using a control model that tracks one or more process state variables associate with the fabrication. For example, a controller may adjust a photolithography recipe parameter to control a critical dimension (CD) of the manufactured devices. Likewise, a controller may control an etch tool to affect a trench depth or a spacer width characteristic.

To provide stability for the controller, control actions are typically not generated based on just the most recently observed process state variable. Hence, the previous measurements are typically passed through an exponentially weighted moving average (EWMA) filter that outputs an average value for the process state that factors in the current and previous values. The EWMA filter is a weighted average in that the average is more heavily affected by the more recent state values.

EWMA filters have been employed for estimating process states for many years in the semiconductor industry. The general equation for an EWMA filter is:

$$\hat{y}_{k+1} = \frac{\omega_0 y_k + \omega_1 y_{k-1} + \omega_2 y_{k-2} + \cdots + \omega_n y_{k-n}}{\omega_0 + \omega_1 + \omega_2 + \cdots + \omega_n}, \quad (1)$$

where the weighting factor, $\omega_1 = (1-\lambda)^1$, discounts older measurements, and $\lambda$ IS a tuning parameter that affects the level of discounting (i.e., $0 < \lambda < 1$).

In cases where the number of measurements is large, the oldest measurements have a negligible contribution to the filtered value, and a recursive EWMA filter may be used:

$$\hat{y}_{k+1} = (1-\lambda)\hat{y}_k + \lambda y_k. \quad (2)$$

The recursive EWMA filter tracks only a previous process state estimate and updates the estimate as new data is received based on a weighting factor, λ.

The EWMA filter has several limitations when employed to a semiconductor environment. In a semiconductor fabrication environment, discrete processes are performed on individual wafers or groups of wafers (i.e., lots). Metrology data used to determine the process state is collected in separate discrete events. The metrology resources are shared to collect data regarding wafers of different types and at different stages of completion. Hence, the metrology data collected associated with a given process state is not received by the controller at constant update intervals.

Moreover, due to the number of independent process tools and metrology tools, the metrology data does not necessarily arrive in sequential time order. In other words, lots are not always measured in the same order as they were processed. The recursive EWMA filter does not account for out-of-order processing, as it assumes that wafers are processed sequentially. Samples are applied to generate new process state estimates as they are received. Also, once a sample has been incorporated in to the recursive EWMA state estimate, it cannot be undone. Also, the EWMA filter is not able to account for time significant time gaps between sequential processes. The EWMA discounts data identically whether there is a large time gap between sequential processes or a relatively short gap. A tool may drift during a large time gap, as the EWMA filter does not receive process state updates. Finally, an EWMA filter does not provide a quality metric for the process state estimate. An EWMA state estimate with old and sparse data is treated identically to new and well characterized data.

This section of this document is intended to introduce various aspects of art that may be related to various aspects of the present invention described and/or claimed below. This section provides background information to facilitate a better understanding of the various aspects of the present invention. It should be understood that the statements in this section of this document are to be read in this light, and not as admissions of prior art. The present invention is directed to overcoming, or at least reducing the effects of, one or more of the problems set forth above.

BRIEF SUMMARY OF THE INVENTION

The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

One aspect of the present invention is seen in a method for estimating a state associated with a process includes receiving a state observation associated with the process. The state observation has an associated process time. A weighting factor to discount the state observation is generated based on the process time. A state estimate is generated based on the discounted state observation.

Another aspect of the present invention is seen in a system including a process tool, a metrology tool, and a process controller. The process tool is operable to perform a process in accordance with an operating recipe. The metrology tool is operable to generate a state observation associated with the process. The process controller is operable to receive the state observation, the state observation having an associated process time, generate a weighting factor to discount the state observation based on the process time, generate a state estimate based on the discounted state observation, and determine at least one parameter of the operating recipe based on the state estimate.

BRIEF DESCRIPTION OF THE SEVERAL VIEWS OF THE DRAWINGS

The invention will hereafter be described with reference to the accompanying drawings, wherein like reference numerals denote like elements, and.

Figure 1:
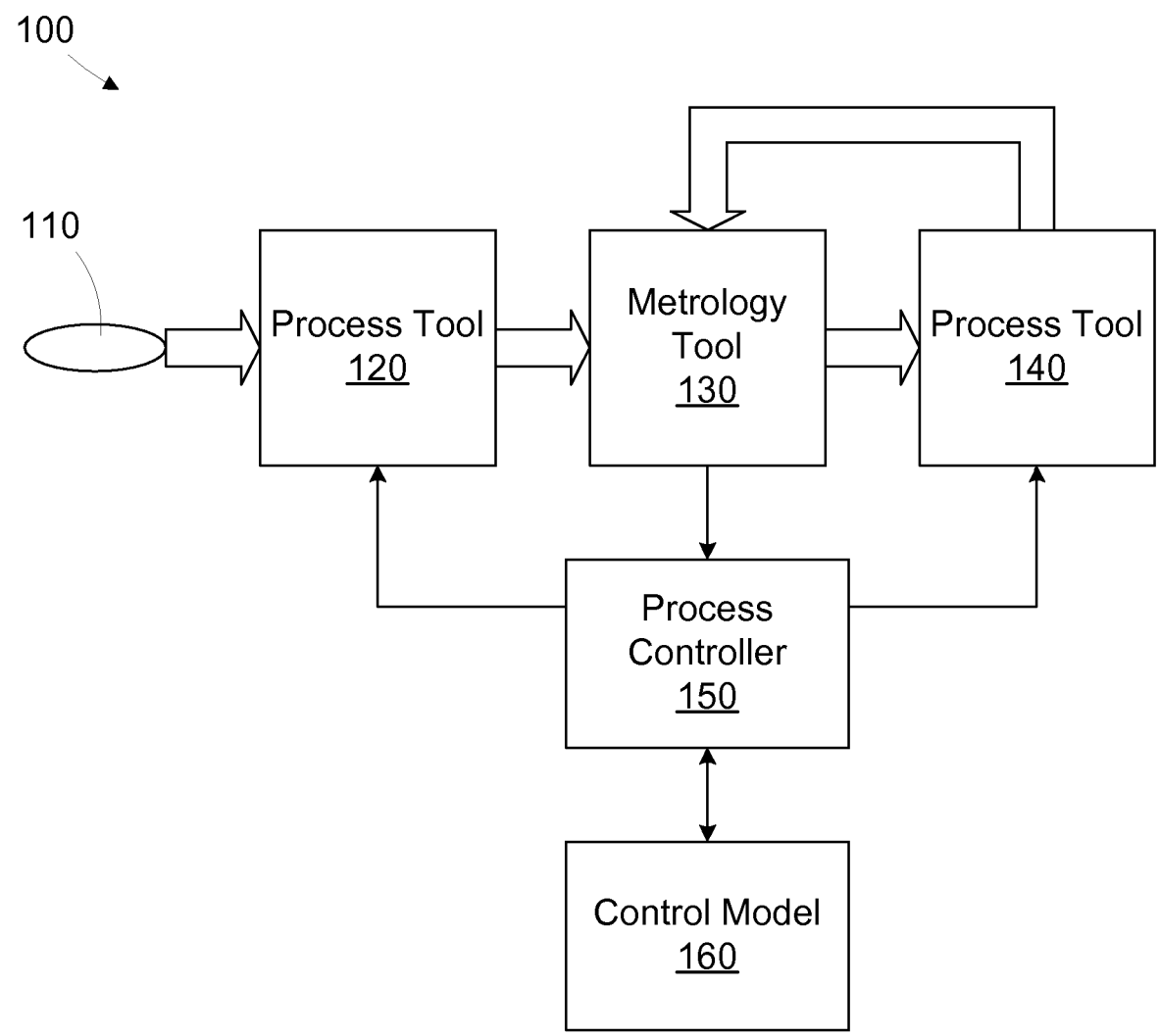
FIG. 1 is a simplified block diagram of a processing line in accordance with one illustrative embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

One or more specific embodiments of the present invention will be described below. It is specifically intended that the present invention not be limited to the embodiments and illustrations contained herein, but include modified forms of those embodiments including portions of the embodiments and combinations of elements of different embodiments as come within the scope of the following claims. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the present invention unless explicitly indicated as being "critical" or "essential."

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Referring now to the drawings wherein like reference numbers correspond to similar components throughout the several views and, specifically, referring to FIG. 1, the present invention shall be described in the context of an illustrative processing line 100 for processing wafers 110 in accordance with the present invention. The processing line 100 includes a first process tool 120, a metrology tool 130, a second process tool 140, and a process controller 150. The process controller 150 receives data from the metrology tool 130 and adjusts the operating recipe of one or both of the process tools 120, 140 to reduce variations in the characteristics of the processed wafers 110. Of course, separate process controllers 150 may be provided for each tool 120, 140. The particular control actions taken by the process controller 150 depend on the particular processes performed by the process tools 120, 140, and the output characteristic measured by the metrology tool 130. In the illustrated embodiment, the process controller 150 employs a time discounted exponentially weighted filtering technique for estimating process states associated with the wafers 110. Generally, metrology data collected by the metrology tool 130 provides information for adjusting an estimated state employed by the process controller 150. The estimated state is used by the process controller 150 for adjusting the operating recipe of the controlled tool 120, 140.

Although the invention is described as it may be implemented in a semiconductor fabrication facility, the invention is not so limited and may be applied to other manufacturing environments, and essentially any EWMA application. The techniques described herein may be applied to a variety of workpieces including, but not limited to microprocessors, memory devices, digital signal processors, application specific integrated circuits (ASICs), or other similar devices. The techniques may also be applied to workpieces other than semiconductor devices.

The process controller 150 may use a control model 160 of the process tool 120, 140 being controlled to generate control actions. The control model 160 may be developed empirically using commonly known linear or non-linear techniques. The control model 160 may be a relatively simple equation based model or a more complex model, such as a neural network model, principal component analysis (PCA) model, partial least squares/projection to latent structures (PLS) model. The specific implementation of the control model 160 may vary depending on the modeling technique selected and the process being controlled. Using the control model 160, the process controller 150 may determine operating recipe parameters to reduce variation in the characteristics of the wafers 110 being processed.

In the illustrated embodiment, the process controller 150 is a computer programmed with software to implement the functions described. However, as will be appreciated by those of ordinary skill in the art, a hardware controller designed to implement the particular functions may also be used. Moreover, the functions performed by the process controller 150, as described herein, may be performed by multiple controller devices distributed throughout a system. Additionally, the process controller 150 may be a stand-alone controller, it may be resident on the process tool 120, 140, or it may be part of a system controlling operations in an integrated circuit manufacturing facility. Portions of the invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Generally, the process controller 150 implements a time-weighted technique for generating process state estimates. By discounting the process state observations by process time (i.e., the time that the wafer or lot was processed in the tool 120, 140), the process controller 150 addresses the issue of out-of-order processing. Additionally, in a recursive application, the time-weighted technique also discounts based on the time since the last state update, thereby allowing the process controller 150 to address the issue of observation gaps.

Figure 2:
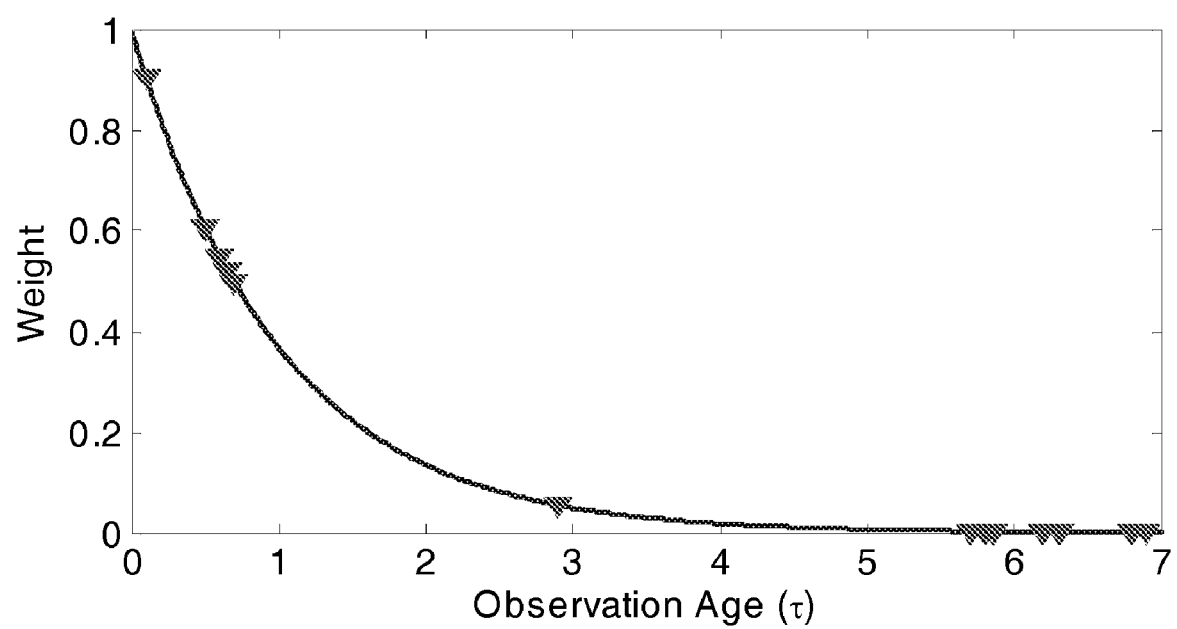
FIG. 2 is a diagram illustrating the weight applied to a particular observation as a function of the age of the observation.

The general equation for a time-weighted EWMA filter (t-EWMA) is:

$$\hat{y}_{k+1} = \frac{\omega_0 y_k + \omega_1 y_{k-1} + \omega_2 y_{k-2} + \cdots + \omega_n y_{k-n}}{\omega_0 + \omega_1 + \omega_2 + \cdots + \omega_n}, \quad \omega_i = \exp\left(\frac{-t_i}{\tau}\right), \quad (3)$$

where $\tau$ represents a predetermined time constant associated with the process being monitored that determines how quickly previous state observation information is discounted, and $t_i$ is the elapsed time since the wafer/lot was processed in the tool 120, 140 (i.e., $t_i = t - t_p$). FIG. 2 illustrates the weight applied to a particular observation as a function of the age of the observation in terms of the elapsed time since processing.

The equation for a recursive Rt-EWMA filter is:

$$\hat{y}_{k+1} = \frac{\omega_k \hat{y}_k + \omega_{new} y_{new}}{\omega_k + \omega_{new}}, \quad (4)$$

where $$\omega_k = \omega_{k,old} \exp\left(\frac{-\Delta t}{\tau}\right), \quad (\Delta t = \text{time since last state update}) \quad (5)$$

and $$\omega_{new} = \exp\left(\frac{t - t_p}{\tau}\right). \quad (6)$$

Figure 3:
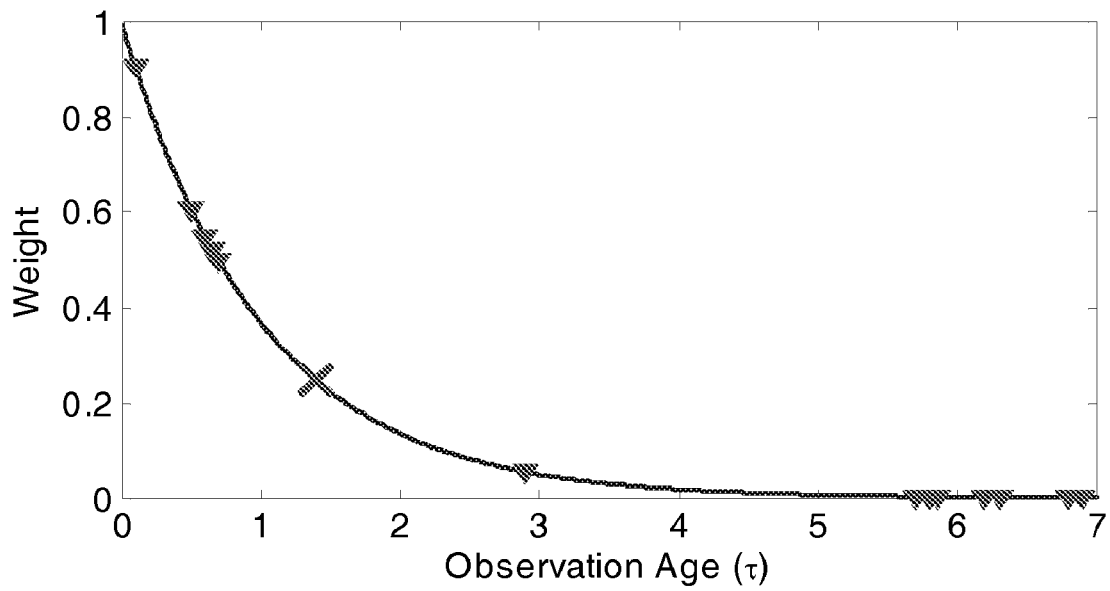
FIGS. 3 and 4 illustrate weights applied to exemplary new observations.
Figure 4:
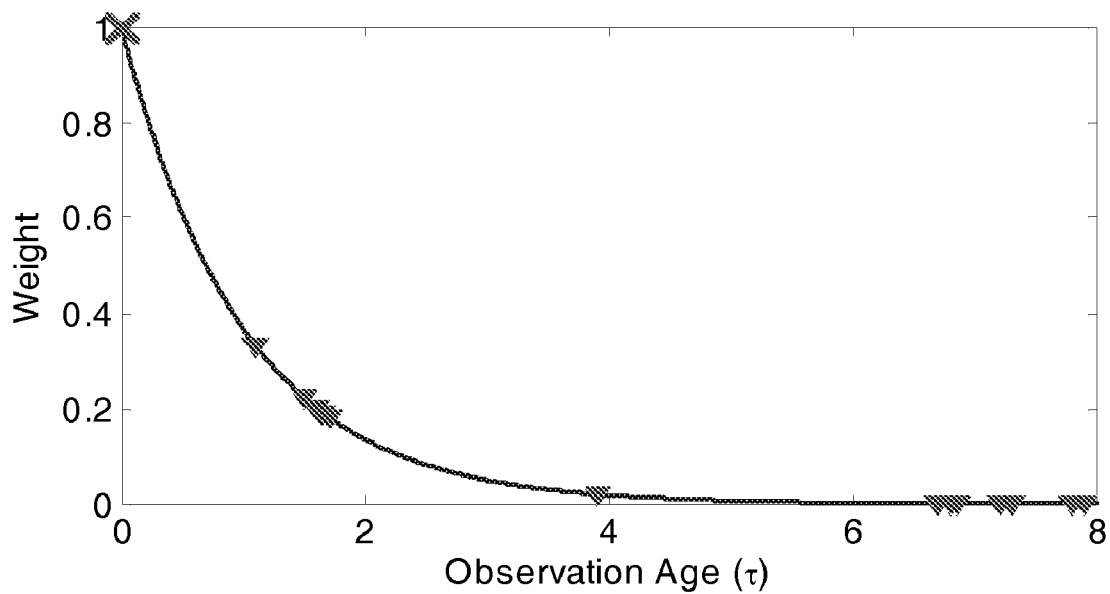

Referring now to FIG. 3, consider a time-delayed observation with an observation age of approximately 1.4. Due to the time-delay, the process state observation is discounted such that it has a weighting factor of approximately 0.25 in accordance with Equation 6. FIG. 4 illustrates a new observation with no metrology delay. The weighting factor is 1.0 as the process state observation is current. In both cases the previous weighting factor is discounted in accordance with Equation 5 based on the time since the last state update.

Figure 5:
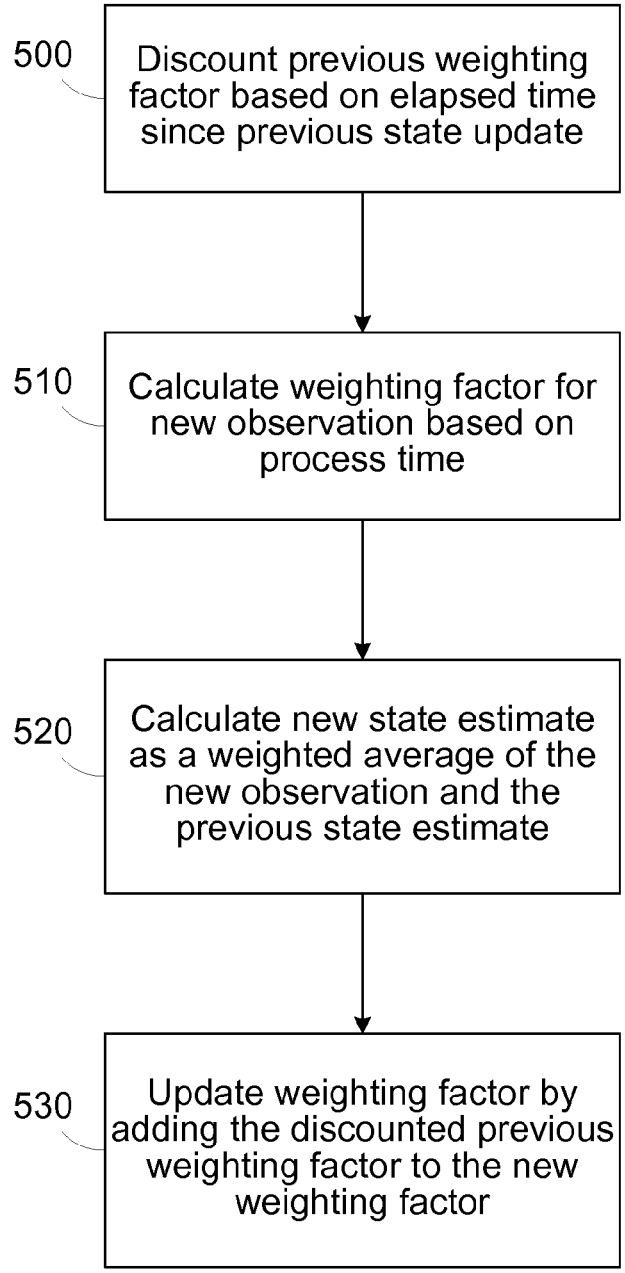
FIG. 5 is a simplified flow diagram of a method for implementing a recursive time weighted EWMA in accordance with another illustrative embodiment of the present invention.

Turning now to FIG. 5, a simplified flow diagram of a method for implementing an Rt-EWMA is shown. To implement the Rt-EWMA, only the previous weight, $\omega_{k,old}$, the previous state estimate, $\hat{y}_k$, and the time stamp of the previous state update need be stored. To update the stored Rt-EWMA parameters, the new observation, $y_{new}$, the time stamp of the process run, $t_p$, and the current time stamp are considered.

In method block 500, the previous weighting factor, $\omega_{k,old}$, is discounted based on the elapsed time since the previous state update (Equation 5). In method block 510, the weighting factor for the new observation, $\omega_{new}$, is determined based on the process time, $t_p$ (Equation 6). The new state estimate is calculated as a weighted average of the new observation, $y_k$, and the previous state estimate, $\hat{y}_k$, in method block 520 (Equation 4). In method block 530, the weighting factor is updated by adding the discounted previous weighting factor to the new weighting factor:

$$\omega_{k+1} = \omega_k + \omega_{new}. \quad (7)$$

One significant advantage of the Rt-EWMA technique is that observations may be "undone" from the state estimate. For example, consider that an outlier state observation resulted from a fault condition that does not reflect the general process state. In some cases there might be a delay before identifying that the state observation is associated with an outlier condition and should be ignored when determining the state estimate. However, in a conventional recursive EWMA setting an observation cannot be removed from the state estimate once it has been aggregated into the state estimate. Contrastingly, as the Rt-EWMA technique avoids the problems with out of order processing, the observation can be undone if the observation, $y_x$, and process time stamp, $t_p$, are known:

$$\hat{y}_k = \frac{\omega_{k+1}\hat{y}_{k+1} - \exp\!\left(\frac{t_p - t}{\tau}\right) y_x}{\omega_{k+1} - \exp\!\left(\frac{t_p - t}{\tau}\right)}, \quad \omega_k = \omega_{k+1} - \exp\!\left(\frac{t_p - t}{\tau}\right). \quad (8)$$

Note that the weighting factor for removing the state observation is the same as was used for adding the state observation, as it is based on the process time. Also, the composite weighting factor is adjusted by simply subtracting the weighting factor added when the state observation was initially added.

The following example illustrates an exemplary implementation of the t-EWMA or Rt-EWMA technique in a semiconductor fabrication setting. In this illustrative example, the process tool 120 is an etch tool and the metrology tool 130 is configured to measure the depth of a trench formed by the etching process. A feedback control equation employed by the process controller 150 in accordance with the control model 160 for determining an etch time, $T_E$, is:

$$T_E = T_B + k(TD_T - \hat{TD}_M), \quad (9)$$

where $T_B$ is a base etch time corresponding to a default etch time value, k is a tuning parameter, TDT is a target trench depth, and $\hat{TD}_M$ is an estimate of the observed trench depth.

The individual trench depth observations are the process state observations that are filtered by the t-EWMA or Rt-EWMA technique to generate a state estimate in accordance with the present invention. The difference between the target depth of the trench and the state estimate for the trench depth reflects an error value. The gain constant, k, represents how aggressively the process controller 150 reacts to errors in the trench depth.

The t-EWMA and Rt-EWMA have numerous advantages over their conventional counterparts when employed in a situation that lacks a regular production interval and in-order state observations, as is present in a semiconductor fabrication environment. Because the incoming observations are discounted based on their process time, the order in which the observations are received does not significantly affect the reliability of the state estimate, thus enhancing the performance of the process controller 150. Also, in a recursive implementation, the effects of time delays between state updates can be minimized due to the discounting applied to the previous state weighting factor. Hence, more recent observations will be given greater weight in determining the state estimate over the more stale observations. Also, observations may be removed from the state estimate if it is determined that they represent outlier data.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

We claim:

1. A method for estimating a state associated with a process, comprising:
   receiving a state observation associated with the process, the state observation having an associated process time indicating a time at which the process was conducted;
   generating a weighting factor to discount the state observation as a function of a value of the process time; and
   generating a state estimate based on the discounted state observation.

2. The method of claim 1, wherein the weighting factor comprises an exponential weighting factor.

3. The method of claim 2, wherein the exponential weighting factor comprises $$\omega_{new} = \exp\!\left(\frac{t_p - t}{\tau}\right),$$

where $t_p$, is the process time, t is a current time, and r is a predetermined time constant.

4. The method of claim 1, wherein generating the state estimate further comprises generating the state estimate using a time-weighted exponentially weighted moving average.

5. The method of claim 1, wherein generating the state estimate further comprises generating the state estimate using a recursive time-weighted exponentially weighted moving average.

6. The method of claim 5, wherein generating the state estimate further comprises:

discounting a weighting factor from a previous state update as a function of the elapsed time since the previous state update; and generating the updated state estimate as a function of the discounted state observation, the discounted weighting factor, and a previous state estimate.

7. The method of claim 6, further comprising updating the weighting factor based on the discounted weighting factor and the weighting factor used to discount the state observation.

8. The method of claim 1, wherein the state observation comprises a first state observation, the process time comprises a first process time, and the method further comprises:

receiving a second state observation associated with the process, the second state observation having a second associated process time indicating a time at which the process conducted for the second state observation, the second process time being earlier than the first process time;

discounting the second state observation based on a value of the second process time; and updating the state estimate based on the discounted second state observation.

9. The method of claim 1, further comprising:

receiving a plurality of state observations associated with the process, each state observation having a process time indicating a time at which the process conducted for the associated state observation;

discounting each state observation as a function of its associated process time; and generating the state estimate based on the discounted state observations.

10. The method of claim 9, wherein generating the state estimate further comprises generating the state estimate using the equation $$\hat{y}_{k+1} = \frac{\omega_0 y_k + \omega_1 y_{k-1} + \omega_2 y_{k-2} + \cdots + \omega_n y_{k-n}}{\omega_0 + \omega_1 + \omega_2 + \cdots + \omega_n},$$

where $$\omega_i = \exp\left(\frac{-t_i}{\tau}\right),$$

where $t_1$ equals a current time, t, minus the associated process time, $t_p$.

11. The method of claim 9, wherein generating the state estimate further comprises generating the state estimate using the equation $$\hat{y}_{k+1} = \frac{\omega_k \hat{y}_k + \omega_{new} y_{new}}{\omega_k + \omega_{new}}, \text{ where}$$

$$\omega_k = \omega_{k,old} \exp\left(\frac{-\Delta t}{\tau}\right) \text{ and } \omega_{new} = \exp\left(\frac{t_p - t}{\tau}\right),$$

where $t_p$ represents the associated process time.

12. The method of claim 9, wherein generating the state estimate further comprises generating an updated state estimate responsive to the receipt of each state observation, and wherein generating each updated state estimate further comprises:

generating a new weighting factor for the updated state estimate as a function of the process time associated with the state observation being incorporated into the updated state estimate;

discounting a weighting factor associated with a previous updated state estimate as a function of the elapsed time since the generation of the previous updated state estimate; and generating the updated state estimate as a function of the new weighting factor, the state observation being incorporated into the updated state estimate, the discounted weighting factor associated with the previous updated state estimate, and the previous updated state estimate.

13. The method of claim 12, further comprising removing a selected one of the state observations from the state estimate.

14. The method of claim 13, wherein removing the selected state observation further comprises:

generating a removal weighting factor for the selected state observation as a function of the associated process time; and removing the selected state observation using the selected state observation and the removal weighting factor.

15. The method of claim 14, wherein removing the selected state observation further comprises removing the selected state observation using the equation $$\hat{y}_k = \frac{\omega_{k+1} \hat{y}_{k+1} - \exp\left(\frac{t_p - t}{\tau}\right) y_X}{\omega_{k+1} - \exp\left(\frac{t_p - t}{\tau}\right)}, \quad \omega_k = \omega_{k+1} - \exp\left(\frac{t_p - t}{\tau}\right),$$

where $t_p$ represents the associated process time.

16. The method of claim 12, wherein the process comprises a semiconductor fabrication process, controlling the process further comprises determining at least one parameter of an operating recipe for semiconductor fabrication process, and the method further comprises processing semiconductor devices subsequent to determining the at least one parameter of the operating recipe.

17. The method of claim 1, further comprising controlling the process based on the state estimate.

18. A computer implemented method for filtering data, comprising:

receiving a plurality of data elements, each data element having an associated time stamp;

generating a weighting factor to discount each data element as a function of a value of the associated time stamp; and generating a data element estimate based on the discounted data elements.

19. The method of claim 18, wherein generating the data element estimate further comprises generating an updated data element estimate responsive to the receipt of each data element, and wherein generating each updated data element estimate further comprises:

generating a new weighting factor for the updated data element estimate as a function of the time stamp associated with the data element being incorporated into the updated data element estimate;

discounting a weighting factor associated with a previous updated data element estimate as a function of the elapsed time since the generation of the previous updated data element estimate; and generating the updated data element estimate as a function of the new weighting factor, the data element being incorporated into the updated data element estimate, the discounted weighting factor associated with the previous updated data element estimate, and the previous updated data element estimate.

20. A system, comprising:

a process tool operable to perform a process in accordance with an operating recipe;

a metrology tool operable to generate a state observation associated with the process; and a process controller operable to receive the state observation, the state observation having an associated process time indicating a time at which the process was performed, generate a weighting factor to discount the state observation as a function of a value of the process time, generate a state estimate based on the discounted state observation, and determine at least one parameter of the operating recipe based on the state estimate.

21. A system comprising:

means for receiving a state observation associated with the process, the state observation having an associated process time indicating a time at which the process was conducted;

means for generating a weighting factor to discount the state observation as a function of a value of the process time; and means for generating a state estimate based on the discounted state observation.

\* \* \* \* \*